United States Patent

[19]

Ohba et al.

[11] Patent Number: 5,852,087
[45] Date of Patent: Dec. 22, 1998

[54] EASILY DYEABLE META-LINKAGE-CONTAINING AROMATIC POLYAMIDE FIBERS

[75] Inventors: Akihiro Ohba, Matsuyama; Koki Sasaki, Iwakuni, both of Japan

[73] Assignee: Teijin Limited, Osaka, Japan

[21] Appl. No.: 769,830

[22] Filed: Dec. 20, 1996

Related U.S. Application Data

[63] Continuation-in-part of Ser. No. 600,874, Feb. 13, 1996, abandoned.

[51] Int. Cl.$^6$ ..................................................... C08L 77/10
[52] U.S. Cl. ............................ 524/154; 524/91; 524/142; 524/144; 524/155; 524/158; 524/159
[58] Field of Search ..................................... 524/155, 154, 524/158, 159, 91, 142, 144

[56] References Cited

U.S. PATENT DOCUMENTS

| | | |
|---|---|---|
| 3,039,990 | 6/1962 | Huffman . |
| 3,142,662 | 7/1964 | Huffman . |
| 3,409,596 | 11/1968 | Unger et al. . |
| 3,506,990 | 4/1970 | Richardson et al. . |
| 3,695,992 | 10/1972 | Moulds . |
| 3,779,705 | 12/1973 | Kitamura et al. . |
| 4,196,118 | 4/1980 | Fujie et al. . |
| 4,278,779 | 7/1981 | Nakagawa et al. . |
| 4,755,335 | 7/1988 | Ghorashi . |

FOREIGN PATENT DOCUMENTS

| | | |
|---|---|---|
| 0006564 | 1/1980 | European Pat. Off. . |
| 0212948 | 3/1987 | European Pat. Off. . |
| 0228224 | 7/1987 | European Pat. Off. . |
| 0330163 | 8/1989 | European Pat. Off. . |
| 44-11168 | 5/1969 | Japan . |
| 48-96827 | 12/1973 | Japan . |
| 50-59522 | 5/1975 | Japan . |
| 51-26320 | 3/1976 | Japan . |
| 55-21406 | 2/1980 | Japan . |
| 5243930 | 7/1981 | Japan . |

OTHER PUBLICATIONS

Database WPI Section Ch Week 9622 Derwent Publications Ltd. An 96–217525 JP–A–08–081, 827 Abstract.

*Primary Examiner*—Patricia A. Short
*Attorney, Agent, or Firm*—Sughrue, Mion, Zinn, Macpeak & Seas, PLLC

[57] ABSTRACT

Easily dyeable meta-linkage-containing aromatic polyamide fibers consisting of a composition which comprises a meta-linkage-containing aromatic polyamide incorporating a quaternary onium salt of an alkylbenzenesulfonic acid. They are easily dyeable with cationic dyes, and thus may be used in the fields of bedding, clothing and interior decoration.

15 Claims, No Drawings

EASILY DYEABLE META-LINKAGE-CONTAINING AROMATIC POLYAMIDE FIBERS

CROSS-REFERENCE TO RELATED APPLICATIONS

This application is a continuation-in-part of application Ser. No. 08/600,874, filed Feb. 13, 1996, now abandoned.

BACKGROUND OF THE INVENTION

1. Field of the Invention

The present invention relates to meta-linkage-containing aromatic polyamide fibers which are dyeable with cationic dyes.

2. Description of the Related Art

Meta-linkage-containing aromatic polyamide fibers have molecular skeletons consisting almost totally of aromatic rings, and thus have excellent heat resistance, flame retardance and flame proofness. As a result, such fibers are suitable for use as industrial materials for which heat resistance is required, and for use in clothing and interior decoration for which flame retardance and flame proofness are considered important; they are rapidly attaining wider use especially in the fields of clothing, bedding materials and interior decoration which take advantage of their flame retardance and flame proofness. These fields usually employ dyed fibers, but while meta-linkage-containing aromatic polyamide fibers have excellent physical characteristics, their rigid polymer chains make them very difficult to dye by conventional methods.

A number of improved methods have been proposed in order to use meta-linkage-containing aromatic polyamide fibers in these fields. For example, in Japanese Unexamined Patent Publication No. 50-59522 there have been proposed pigmented fibers obtained by incorporating meta-linkage-containing aromatic polyamide fibers with a specific pigment; because the fibers are incorporated with the pigment during the production process, however, there is a drawback of considerable efficiency loss when colors are changed, which means that the method cannot be adapted well to small-lot production and more time is required to respond to client's orders. As a means of improving the dyeing property, Japanese Unexamined Patent Publication No. 55-21406 (U.S. Pat. No. 4,278,779) has proposed a method of adding a polymer copolymerized with xylylenediamine; however, since a third component is copolymerized with the polymer chain, polymerization equipment and polymer stocking equipment must be specialized for the particular polymer used, which presents a problem of increased cost. In addition, Japanese Examined Patent Publication No. 52-43930 (U.S. Pat. No. 3,695,992) proposes polyporous aromatic polyamide fibers with an improved dyeing property, having a pore size, void volume and density within specific ranges; nevertheless, the dyeing property of these fibers has not been sufficient, and associated drawbacks have included difficulty in setting the dyeing conditions because of the required pigments and organic dyeing aids during the dyeing, as well as difficulty in disposal of the waste liquors after use.

There has also been proposed in, for example, Japanese Examined Patent Publication No. 44-11168 (U.S. Pat. No. 3,506,990), a meta-linkage-containing aromatic polyamide prepared by copolymerization with a compound having sulfonate groups introduced therein. This polymer, however, has certain disadvantages in that purification of the starting material is very difficult, and it is impossible to obtain a stable polymer with the necessary degree of polymerization and whiteness. Furthermore, production of aromatic polyamides prepared by copolymerization with components having sodium sulfonate groups is disclosed in Japanese Unexamined Patent Publication Nos. 48-96827 and 51-26320, and in U.S. Pat. Nos. 3,039,990, 3,142,662 and 3,409,596. However, although aromatic polyamides are usually prepared by reacting a dicarboxylic halide with a diamine, the sodium sulfonate groups when present react with the acid halide, making it impossible to obtain a polymer with satisfactory physical properties.

SUMMARY OF THE INVENTION

In light of the aforementioned problems of the prior art, it is an object of the present invention to provide, by inexpensive and simple means, meta-linkage-containing aromatic polyamide fibers with excellent dyeing properties which may be used in the fields of bedding, clothing and interior decorating.

In order to achieve the above-mentioned object, the present invention provides easily dyeable meta-linkage-containing aromatic polyamide fibers consisting of a composition which comprises a meta-linkage-containing aromatic polyamide incorporating a quaternary onium salt of an alkylbenzenesulfonic acid.

DESCRIPTION OF THE PREFERRED EMBODIMENTS

The meta-linkage-containing aromatic polyamide to be used according to the present invention consists substantially of aromatic rings constituting the main skeleton, which have amide linkages at the meta-positions. Particularly preferred among such meta-linkage-containing aromatic polyamides is a poly-m-phenylene isophthalamide consisting of repeating units represented by the following chemical formula.

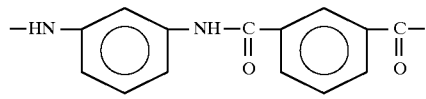

In an embodiment of the present invention, at least 85 mole percent of the repeating units of the meta-linkage-containing aromatic polyamide are a poly-m-phenylene isophthalamide consisting of repeating units represented by the above chemical formula.

The meta-linkage-containing aromatic polyamide may also be a copolymer comprising less than 15 mole percent of a third component. Monomers constituting the third component may be aromatic diamine components such as, for example, para-phenylenediamine, 3,4'-diaminodiphenyl ether, 4,4'-diaminodiphenyl ether, para-xylylenediamine, biphenylenediamine, 3,3'-dichlorobenzidine, 3,3'-dimethylbenzidine, 3,4'-diaminodiphenylmethane, 4,4'-diaminodiphenylmethane, 1,5-naphthalenediamine; and as acid components, aromatic dicarboxylic acids such as, for example, terephthalic acid, naphthalene-2,6-dicarboxylic acid, naphthalene-2,7-dicarboxylic acid, particularly preferred of which is terephthalic acid. These aromatic diamines and aromatic dicarboxylic acids may have a portion of the hydrogen atoms on their aromatic rings substituted with halogen atoms or alkyl groups such as methyl.

This type of meta-linkage-containing aromatic polyamide may be produced by a publicly known interfacial polymerization or low-temperature solution polymerization method. The degree of polymerization of the polymer, in terms of the intrinsic viscosity (IV) of a 0.5 g/100 ml solution in N-methyl-2-pyrrolidone at 30° C., is preferably 1.3 to 1.9 dl/g.

The quaternary onium salt of an alkylbenzenesulfonic acid combined with the meta-linkage-containing aromatic polyamide may be a compound such as tetrabutylphosphonium hexylbenzenesulfonate, tributylbenzylphosphonium hexylbenzenesulfonate, tetraphenylphosphonium dodecylbenzenesulfonate, tributylphenylphosphonium dodecylbenzenesulfonate, tetrabutylphosphonium dodecylbenzenesulfonate, tributylbenzylammonium dodecylbenzenesulfonate, etc. Among these, tetrabutylphosphonium dodecylbenzenesulfonate and tributylbenzylammonium dodecylbenzenesulfonate are particularly preferred, because of their ready availability, excellent thermal stability and high solubility in dimethylacetoamide and N-methyl-2-pyrrolidone, which are good solvents for the meta-linkage-containing aromatic polyamide.

In order to obtain an adequate improving effect on the dyeing property, the amount of the quaternary onium salt of an alkylbenzenesulfonic acid to be combined with the meta-linkage-containing aromatic polyamide is preferably between 2.8 and 7.0 mole percent, and more preferably between 3.5 and 7.0 mole percent with respect to the repeating units of the meta-linkage-containing aromatic polyamide. At less than 2.8 mole percent, an adequate improving effect on the dyeing property may not be achieved, while at greater than 7.0 mole percent the single filaments may be more prone to breakage during the fiber production process.

The composition constituting the meta-linkage-containing aromatic polyamide fibers of the present invention, which contains the meta-linkage-containing aromatic polyamide incorporating the quaternary onium salt of an alkylbenzenesulfonic acid, preferably further contains a halogen-containing alkyl phosphate or a halogen-containing phenyl phosphate (hereunder referred to collectively as "halogen-containing alkyl (phenyl) phosphate"). The meta-linkage-containing aromatic polyamide fibers made of such a composition have more excellent dyeing properties.

As halogen-containing alkyl (phenyl) phosphates there may be mentioned compounds such as tris(β-chloropropyl) phosphate, tris(2,3-dichloropropyl) phosphate, tris (chloroethyl) phosphate, phenyldichloropropyl phosphate and tris(dichlorophenyl) phosphate. Although these compounds have been found to have virtually no effect of improving dyeing properties when they alone are combined with meta-linkage-containing aromatic polyamides, they exhibit a specific dyeing property-improving effect when used in tandem with an alkylbenzenesulfonic acid onium salt.

The content of the halogen-containing alkyl (phenyl) phosphate in the polymer is preferably 0.5 to 5.0 wt %, and more preferably 1.8 to 5.0 wt % based on the meta-linkage-containing aromatic polyamide. At less than 0.5 wt % the specific dyeing property-improving effect may not be obtained, and at greater than 5 wt % dye spots may appear during the dyeing process, while the dyeing property-improving effect may not be so greatly enhanced.

The above-mentioned meta-linkage-containing aromatic polyamide composition constituting the meta-linkage-containing aromatic polyamide fibers of the present invention preferably further contains an ultraviolet absorber. Meta-linkage-containing aromatic polyamide fibers made of such a composition not only have a more excellent dyeing property, but also impart excellent light fastness to the dyed product.

The ultraviolet absorber is preferably a benzotriazole-based ultraviolet absorbing compound. This is because meta-linkage-containing aromatic polyamides have an ultraviolet absorbance range of from 340 to 360 nm, and most benzotriazole-based compounds have maximum absorbance wavelengths within this range.

As is well-known, meta-linkage-containing aromatic polyamides undergo considerable yellowing upon exposure to light rays, as a result of their molecular structure characteristics. Consequently, even if the dyeing property is improved to provide finely dyed fibers, their value as marketable dyed fibers is reduced by half when the color shade is altered due to yellowing after dyeing. Thus, by combining excellent light fastness with the excellent dyeing property, their value is greatly increased as meta-linkage-containing aromatic polyamide fibers with an improved dyeing property.

Preferred examples of benzotriazole-based ultraviolet absorbing compounds include 2-(5-methyl-2-hydroxyphenyl)benzotriazole, 2-[2-hydroxy-3,5-bis($\alpha,\alpha'$-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl-5-chlorobenzoazole and 2-(3,5-di-t-amyl-2-hydroxyphenyl)benzotriazole. Among these, 2-[2-hydroxy-3,5-bis($\alpha,\alpha'$-dimethylbenzyl)phenyl]-2H-benzotriazole is particularly preferred because of its heat resistance and high solubility in dimethylacetoamide and N-methyl-2-pyrrolidone, which are good solvents for the meta-linkage-containing aromatic polyamide.

The amount of the ultraviolet absorber to be added is preferably 2.0 to 6.0 wt %, and particularly 3.0 to 5.0 wt % based on the meta-linkage-containing aromatic polyamide. If the amount is less than 2.0 wt% the anti-yellowing effect may not be exhibited, and even if it is added at greater than 6.0 wt % no further improvement in the anti-yellowing effect may result, while the workability of the fibers during the production process may be reduced.

The mixture of the meta-linkage-containing aromatic polyamide with the quaternary onium salt of an alkylbenzenesulfonic acid, halogen-containing alkyl (phenyl) phosphate and ultraviolet absorber may be accomplished by a method wherein the meta-linkage-containing aromatic polyamide is added to a solvent and mixed therewith to make a solution to which solutions of the quaternary onium salt of an alkylbenzenesulfonic acid, halogen-containing alkyl (phenyl) phosphate and ultraviolet absorber each in appropriate solvents are then added and mixed therewith, or an alternative method in which the meta-linkage-containing aromatic polyamide, quaternary onium salt of an alkylbenzenesulfonic acid, halogen-containing alkyl (phenyl) phosphate and ultraviolet absorber are combined into a mixture which is then dissolved in a solvent. The dope obtained in this manner may then be formed into fibers by a publicly known method.

An example of a typical fiber-forming method involves addition of the quaternary onium salt of an alkylbenzenesulfonic acid, halogen-containing alkyl (phenyl) phosphate and benzotriazole-based ultraviolet absorber to an N-methyl-2-pyrrolidone solution containing a poly-m-phenylene isophthalamide polymer, to prepare a dope. The dope is extruded from a nozzle into an aqueous inorganic solution whose main component is calcium chloride, stretched after coagulation and washing with water, and then further stretched on a hot plate at 300°–325° C. and crystallized, and finally subjected to oiling to complete the fibers. For staple fibers, they are crimped, cut and then spun to obtain easily dyeable spun fibers.

The easily dyeable meta-linkage-containing aromatic polyamide fibers of the present invention obtained in the manner described above have an excellent dyeing property and light fastness without any loss in the excellent heat resistance, flame retardance and flame proofness of the original meta-linkage-containing aromatic polyamide fibers, and thus may be effectively applied for clothing, bedding and interior decorations which require coloring. In particular, the addition of the halogen-containing alkyl (phenyl) phosphate provides further improvement in the flame retardance while drastically improving the dyeing property and lowering the dyeing cost compared to addition of the quaternary onium salt of an alkylbenzenesulfonic acid alone, and addition of the ultraviolet absorber, particularly a benzotriazole-based ultraviolet absorbing compound, drastically improves the light fastness, allowing the fibers to be applied in the fields of clothing, bedding and interior decorations in the same manner as existing common fibers.

The present invention is explained below by way of the examples. The measured values in the examples and comparative examples were obtained by the following methods.

1. Dyeing property

Crimped fibers were collectively cut to a length of 50 mm and dyed at 30° C. for 90 minutes using a dyeing solution comprising 8% o.w.f. Estrol Navy Blue N-RL (product of Sumitomo Chemical Co., Ltd.), 0.3 g/l acetic acid and 25 g/l sodium nitrate to a fiber/dyeing solution ratio (liquor ratio) of 1:40, after which a solution comprising 1 g/l hydrosulfite, 1 g/l Amiladin D (product of Dai-ichi Kogyo Seiyaku Co., Ltd.) and 1 g/l sodium hydroxide was used at a liquor ratio of 1:40 for reductive washing at 80° C. for 30 minutes, followed by water washing and drying. A 1.3 g portion of the fibers was stuffed into a cell having a diameter of 31 mm and a depth of 13 mm, and a CM-2002 Minolta spectrophotometric colorimeter was used for colorimetry with a 10° field of view, a D76 light source and regular reflection elimination, using the value $L^*$ as an index of the dyeing property.

2. Intrinsic viscosity (IV)

The polymer was dissolved in N-methyl-2-pyrrolidone (NMP) to a concentration of 0.5 g/100 ml, and an Ostwald's viscometer was used for measurement at 30° C.

3. Fineness

The fineness of the fibers was measured according to JIS-L-1015.

4. Tensile strength

The tensile strength of the fibers was measured according to JIS-L-1074, with a 20 mm long test sample, an initial load of 1/20 g/de and an elongation rate of 20 mm/min.

5. Quaternary alkylbenzenesulfonic acid onium salt content of fibers

As a standard sulfur sample, 0.1 cc of an aqueous $(NH_4)_2SO_4$ solution of known concentration is dropped onto test filtration paper, and a calibration curve is prepared based on fluorescent X-ray quantitative analysis after vacuum drying. About 50 mg of the fibers and about 20 mg of calcium chloride are dissolved in 5.0 cc of NMP by heating at 110° C. for 1 hour, and after dropping a standard amount (0.1 cc) on the test filtration paper, it is vacuum dried. The sample is then quantitatively analyzed by fluorescent X-ray analysis, the sulfur concentration of the fibers is calculated based on the previously prepared calibration curve, and this is converted into the content on the assumption that all of the sulfur is derived from the quaternary onium salt of an alkylbenzenesulfonic acid.

6. Alkyl (phenyl) phosphate content of fibers

In the same manner as above, a calibration curve is prepared by fluorescent X-ray analysis of a standard phosphorus sample of known concentration, the phosphorus concentration of the fibers is calculated, and this is converted into a content on the assumption that all of the phosphorus is derived from the alkyl (phenyl) phosphate.

7. Benzotriazole-based ultraviolet absorbing compound content of fibers

About 20 mg of a sample dried at 105° C. for 60 minutes is measured into a test tube (120 mm×10 mmΦ, pyrex), 4 ml of concentrated hydrochloric acid is added and the tube is sealed. The sealed tube is heated at 130° C. for about 6 hours for hydrolysis. After completion of hydrolysis, the sealed tube is cooled to room temperature and opened. The total contents of the test tube are then transferred to a 50 ml separatory funnel, 5 ml of chloroform is added, and the mixture is adequately shaken and allowed to stand, after which the chloroform phase is removed. This extraction procedure with chloroform is repeated 3 times, all of the chloroform phases are combined and concentrated to 2–3 ml, and the solution is then analyzed by liquid chromatography (LC). Separately, a test sample is prepared for a calibration curve, which is obtained by the same procedure as described above. The calibration curve is used to quantify the benzotriazole-based compound in the sample.

8. Measurement of light fastness

About 2 g of sample (crimped and cut to lengths of 38–76 mm) is taken and dispersed with a hand card. The dispersed sample is affixed to a mount to a width of 18–22 mm and a thickness of 2–3 mm, as shown in FIG. 1. The mount is then set onto a metallic flask. The metallic flask is set into a fade tester (Model CF-20N, product of Shimazu Laboratories), and irradiated for a prescribed time with an arc current of 15–17 A and an internal temperature of 42–45° C. The difference in the degree of discoloration of the "irradiated" and "non-irradiated" sections of the irradiated sample is judged visually against the difference in discoloration of a simultaneously irradiated blue scale (JIS L0841, product of Japan Standards Association).

EXAMPLE 1

A 30 g portion of poly-m-phenylene isophthalamide with an IV of 1.35 dl/g was dissolved in 110 g of NMP and further mixed with 3.6 g of tetrabutylphosphonium dodecylbenzenesulfonate, and the solution was subjected to vacuum degassing to make a spinning dope.

The dope was heated to 85° C. and then used for wet spinning into a spinning bath from a spinning nozzle with 200 holes, each with a diameter of 0.07 mm. The composition of the spinning bath was 40 wt % calcium chloride, 5 wt % NMP and 55 wt % water, and the temperature of the spinning bath was 85° C. The filaments were given a course of about 100 cm through the spinning bath, and were drawn at a rate of 6.2 m/min. The filaments were then washed with water, stretched to a draw ratio of 2.4 in 95° C. hot water, and dried using a roll at 200° C., after which they were stretched to a draw ratio of 1.75 on a 320° C. hot plate to obtain stretched filaments with 400 de/200 filaments. The total draw ratio was 4.2.

EXAMPLE 2

A 30 g portion of poly-m-phenylene isophthalamide with an IV of 1.35 dl/g was dissolved in 110 g of NMP and further mixed with a solution of 3.6 g of tributylbenzylammonium dodecylbenzenesulfonate in 2 g NMP, and the solution was subjected to vacuum degassing to make a spinning dope. This dope was used for spinning and stretching in the same manner as in Example 1, to obtain stretched filaments with 400 de/200 filaments.

EXAMPLE 3

A 5.7 g portion of tetrabutylphosphonium dodecylbenzenesulfonate was dissolved in 110 g of NMP, and then 30 g of poly-m-phenylene isophthalamide with an IV of 1.35 dl/g was dissolved therein and the solution was subjected to vacuum degassing to make a spinning dope. This dope was used for spinning and stretching in the same manner as in Example 1, to obtain stretched filaments with 400 de/200 filaments.

EXAMPLE 4

A 2.7 g portion of tetrabutylphosphonium dodecylbenzenesulfonate was dissolved in 110 g of NMP, and then 30 g of poly-m-phenylene isophthalamide with an IV of 1.35 dl/g was dissolved therein and the solution was subjected to vacuum degassing to make a spinning dope. This dope was used for spinning and stretching in the same manner as in Example 1, to obtain stretched filaments with 400 de/200 filaments.

EXAMPLE 5

A 6.0 g portion of tetrabutylphosphonium dodecylbenzenesulfonate was dissolved in 110 g of NMP, and then 30 g of poly-m-phenylene isophthalamide with an IV of 1.35 dl/g was dissolved therein and the solution was subjected to vacuum degassing to make a spinning dope. This dope was used for stretching in the same manner as in Example 1, to obtain stretched filaments with 400 de/200 filaments.

The measurement results of the physical properties of the fibers obtained in Examples 1 to 5 are given in Table 1 below. All of the fibers in these examples were found to have satisfactory dyeing properties, high strength, and satisfactory spinning properties.

TABLE 1

|  | Onium salt content of fibers | Strength (g/de) | Ductility (%) | Dyeing property L* value |
|---|---|---|---|---|
| Example 1 | 4.4 | 5.0 | 44 | 22.0 |
| Example 2 | 4.0 | 4.9 | 45 | 22.5 |
| Example 3 | 7.0 | 4.6 | 42 | 19.5 |
| Example 4 | 3.3 | 5.0 | 43 | 25.0 |
| Example 5 | 7.4 | 4.0 | 39 | 19.0 |

Onium salt: alkylbenzenesulfonic acid onium salt

Content: mole percent with respect to polymer

EXAMPLE 6

A 30 g portion of poly-m-phenylene isophthalamide with an IV of 1.35 dl/g was dissolved in 110 g of NMP, and then 3.6 g of tetrabutylphosphonium dodecylbenzenesulfonate and 1.5 g of tris($\beta$-chloropropyl) phosphate were mixed therewith and the solution was subjected to vacuum degassing to make a spinning dope.

The dope was heated to 85° C. and then used for wet spinning into a spinning bath from a spinning nozzle with 200 holes each with a diameter of 0.07 mm. The composition of the spinning bath was 40 wt % calcium chloride, 5 wt % NMP and 55 wt % water, and the temperature of the spinning bath was 85° C. The filaments were given a course of about 100 cm through the spinning bath, and were drawn at a rate of 6.2 m/min. The filaments were then washed with water, stretched to a draw ratio of 2.4 in 95° C. hot water, and dried using a roll at 200° C., after which they were stretched to a draw ratio of 1.75 on a 320° C. hot plate to obtain stretched filaments with 400 de/200 filaments. The total draw ratio was 4.2.

EXAMPLE 7

A 30 g portion of poly-m-phenylene isophthalamide with an IV of 1.35 dl/g was dissolved in 110 g of NMP, and then a solution of 3.6 g of tributylbenzylammonium dodecylbenzenesulfonate and 1.5 g of tris($\beta$-chloropropyl) phosphate in 2 g of NMP was mixed therewith and the solution was subjected to vacuum degassing to make a spinning dope. This dope was used for spinning and stretching in the same manner as in Example 6, to obtain stretched filaments with 400 de/200 filaments.

EXAMPLE 8

A 3.6 g portion of tetrabutylphosphonium dodecylbenzenesulfonate and 1.5 g of tris(dichlorophenyl) phosphate were dissolved in 110 g of NMP, and then 30 g of poly-m-phenylene isophthalamide with an IV of 1.35 dl/g was dissolved therein and the solution was subjected to vacuum degassing to make a spinning dope. This dope was used for spinning and stretching in the same manner as in Example 6, to obtain stretched filaments with 400 de/200 filaments.

EXAMPLE 9

A 2.25 g portion of tetrabutylphosphonium dodecylbenzenesulfonate and 2.4 g of tris($\beta$-chloropropyl) phosphate were dissolved in 110 g of NMP, and then 30 g of poly-m-phenylene isophthalamide with an IV of 1.35 dl/g was dissolved therein and the solution was subjected to vacuum degassing to make a spinning dope. This dope was used for spinning and stretching in the same manner as in Example 6, to obtain stretched filaments with 400 de/200 filaments.

Comparative Example 1

A 3.6 g portion of tris($\beta$-chloropropyl) phosphate was dissolved in 110 g of NMP, and then 30 g of poly-m-phenylene isophthalamide with an IV of 1.35 dl/g was dissolved therein and the solution was subjected to vacuum degassing to make a spinning dope. This dope was used for spinning and stretching in the same manner as in Example 6, to obtain stretched filaments with 400 de/200 filaments.

EXAMPLE 10

A 2.25 g portion of tetrabutylphosphonium dodecylbenzenesulfonate and 0.45 g of tris($\beta$-chloropropyl) phosphate were dissolved in 110 g of NMP, and then 30 g of poly-m-phenylene isophthalamide with an IV of 1.35 dl/g was dissolved therein and the solution was subjected to vacuum degassing to make a spinning dope. This dope was used for spinning and stretching in the same manner as in Example 6, to obtain stretched filaments with 400 de/200 filaments.

EXAMPLE 11

A 3.6 g portion of tetrabutylphosphonium dodecylbenzenesulfonate and 0.9 g of tris($\beta$-chloropropyl) phosphate were dissolved in 110 g of NMP, and then 30 g of poly-m-phenylene isophthalamide with an IV of 1.35 dl/g was dissolved therein and the solution was subjected to vacuum degassing to make a spinning dope. This dope was used for spinning and stretching in the same manner as in Example 6, to obtain stretched filaments with 400 de/200 filaments.

The measurement results of the physical properties of the fibers obtained in Examples 6 to 11 and Comparative Example 1 are given in Table 2 below. All of the fibers in the examples were found to have satisfactory dyeing properties, high strength, and satisfactory spinning properties. However, the fibers of Comparative Example 1 had a very poor dyeing property, and thus it was found that the tris($\beta$-chloropropyl) phosphate by itself had no effect of improving the dyeing property.

TABLE 2

| | Onium salt content of fibers | Phosphate content of fibers | Strength (g/de) | Ductility (%) | Dyeing property L* value |
|---|---|---|---|---|---|
| Ex. 6 | 4.4 | 3.0 | 4.9 | 44 | 19.0 |
| Ex. 7 | 4.0 | 3.0 | 4.9 | 44 | 19.5 |
| Ex. 8 | 4.4 | 3.0 | 5.0 | 44 | 19.0 |
| Ex. 9 | 2.8 | 4.8 | 4.8 | 39 | 21.5 |
| Comp. Ex. 1 | 0 | 7.2 | 4.0 | 36 | 34.0 |
| Ex. 10 | 2.8 | 0.9 | 5.0 | 45 | 26.5 |
| Ex. 11 | 2.8 | 6.0 | 4.4 | 31 | 21.5 |

Onium salt: alkylbenzenesulfonic acid onium salt
Onium salt content: mole percent with respect to polymer
Phosphate: halogen-containing alkyl (phenyl) phosphate
Phosphate content: weight percent based on polymer

EXAMPLE 12

A 30 g portion of poly-m-phenylene isophthalamide with an IV of 1.35 dl/g was dissolved in 110 g of NMP, and then 3.6 g of tributylbenzylammonium dodecylbenzenesulfonate, 1.5 g of tris($\beta$-chloropropyl) phosphate and 0.6 g of 2-[2-hydroxy-3,5-bis($\alpha,\alpha'$-dimethylbenzyl)phenyl]-2H-benzotriazole were mixed therewith and the solution was subjected to vacuum degassing to make a spinning dope. The dope was heated to 85° C. and then used for wet spinning into a spinning bath from a spinning nozzle with 200 holes each with a diameter of 0.07 mm. The composition of the spinning bath was 40 wt % calcium chloride, 5 wt % NMP and 55 wt % water, and the temperature of the spinning bath was 85° C. The filaments were given a course of about 100 cm through the spinning bath, and were drawn at a rate of 6.2 m/min. The filaments were then washed with water, stretched to a draw ratio of 2.4 in 95° C. hot water, and dried using a roll at 200° C., after which they were stretched to a draw ratio of 1.75 on a 320° C. hot plate to obtain stretched filaments with 400 de/200 filaments. The stretched filaments were crimped with a crimper, and cut to a length of 51 mm with a cutter. The filaments were dyed with Estrol Navy Blue N-2RL (product of Sumitomo Chemical Co., Ltd.) by the method described above, and the dyed filaments were measured for light fastness with a fade tester (Model CF20N, Shimazu Laboratories) by the method described above.

EXAMPLE 13

A 30 g portion of poly-m-phenylene isophthalamide with an IV of 1.35 dl/g was dissolved in 110 g of NMP, and then 3.6 g of tributylbenzylammonium dodecylbenzenesulfonate, 1.5 g of tris($\beta$-chloropropyl) phosphate and 1.2 g of 2-[2-hydroxy-3,5-bis($\alpha,\alpha'$-dimethylbenzyl)phenyl]-2H-benzotriazole were mixed therewith and the solution was subjected to vacuum degassing to make a spinning dope. This dope was used for spinning and stretching in the same manner as in Example 12, to obtain stretched filaments with 400 de/200 filaments. The obtained stretched filaments were crimped, cut, dyed and measured for light fastness by the same method as in Example 12.

EXAMPLE 14

A 30 g portion of poly-m-phenylene isophthalamide with an IV of 1.35 dl/g was dissolved in 110 g of NMP, and then 3.6 g of tributylbenzylammonium dodecylbenzenesulfonate, 1.5 g of tris($\beta$-chloropropyl) phosphate and 1.8 g of 2-[2-hydroxy-3,5-bis($\alpha,\alpha'$-dimethylbenzyl)phenyl]-2H-benzotriazole were mixed therewith and the solution was subjected to vacuum degassing to make a spinning dope. This dope was used for spinning and stretching in the same manner as in Example 12, to obtain stretched filaments with 400 de/200 filaments. The obtained stretched filaments were crimped, cut, dyed and measured for light fastness by the same method as in Example 12.

EXAMPLE 15

A 30 g portion of poly-m-phenylene isophthalamide with an IV of 1.35 dl/g was dissolved in NMP, and then 3.9 g of tributylbenzylammonium dodecylbenzenesulfonate and 1.5 g of tris($\beta$-chloropropyl) phosphate were mixed therewith and the solution was subjected to vacuum degassing to make a spinning dope. This dope was used for spinning and stretching in the same manner as in Example 12, to obtain stretched filaments with 400 de/200 filaments. The obtained stretched filaments were crimped, cut, dyed and measured for light fastness by the same method as in Example 12.

EXAMPLE 16

A 30 g portion of poly-m-phenylene isophthalamide with an IV of 1.35 dl/g was dissolved in 110 g of NMP, and then 3.6 g of tributylbenzylammonium dodecylbenzenesulfonate, 1.5 g of tris($\beta$-chloropropyl) phosphate and 24 g of 2-[2-hydroxy-3,5-bis($\alpha,\alpha'$-dimethylbenzyl)phenyl]-2H-benzotriazole were mixed therewith and the solution was subjected to vacuum degassing to make a spinning dope. This dope was used for spinning and stretching in the same manner as in Example 8, to obtain stretched filaments with 400 de/200 filaments.

There was considerable breakage of single filaments during the spinning and stretching process, and a great deal of fuming on the 320° C. hot plate.

The obtained stretched filaments were crimped, cut, dyed and measured for light fastness by the same method as in Example 12.

The measurement results for Examples 12 to 16 are given in Table 3. All of the fibers in the examples had satisfactory filament quality, dyeing properties and light fastness, except that the fibers of Example 15 did not have an improved light fastness.

TABLE 3

| | Onium salt content of fibers | Phosphate content of fibers | Ultraviolet absorber content of fibers | Strength (g/de) | Ductility (%) | Light fastness (degree) |
|---|---|---|---|---|---|---|
| Ex. 12 | 4.7 | 5.0 | 2.0 | 5.0 | 44 | 3 |
| Ex. 13 | 4.7 | 5.0 | 4.0 | 4.9 | 43 | 4 |
| Ex. 14 | 4.7 | 5.0 | 6.0 | 4.9 | 42 | 4–5 |
| Ex. 15 | 5.1 | 5.0 | 0.0 | 5.1 | 46 | 1–2 |
| Ex. 16 | 4.7 | 5.0 | 8.0 | 4.4 | 38 | 4–5 | onium salt: tributylbenzylammonium dodecylbenzenesulfonate onium salt content: mole percent with respect to polymer Phosphate: tris(β-chloropropyl) phosphate Phosphate content: weight percent with respect to polymer Ultraviolet absorber: 2-[2-hydroxy-3,5-bis(α,α'-dimethylbenzyl)phenyl]-2H-benzotriazole Ultraviolet absorber content: weight percent based on polymer

We claim:

1. Easily dyeable meta-linkage-containing aromatic polyamide fibers consisting of a composition which comprises a meta-linkage-containing aromatic polyamide incorporating a quaternary onium salt of an alkylbenzenesulfonic acid, wherein at least 85 mole percent of the repeating units of the meta-linkage-containing aromatic polyamide are a poly-m-phenylene isophthalamide consisting of repeating units represented by the following chemical formula:

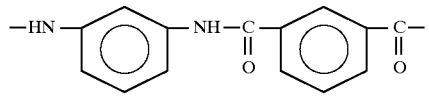

and wherein the content of the quaternary onium salt of an alkylbenzenesulfonic acid is between 2.8 and 7.0 mole percent with respect to the repeating units of the meta-linkage-containing aromatic polyamide.

2. Fibers according to claim 1, wherein the alkylbenzenesulfonate is dodecylbenzenesulfonate.

3. Fibers according to claim 1, wherein the quaternary onium salt is a tetrabutylphosphonium salt.

4. Fibers according to claim 1, wherein the quaternary onium salt is a tributylbenzylammonium salt.

5. Fibers according to claim 1, wherein the meta-linkage-containing aromatic polyamide composition further contains a halogen-containing alkyl phosphate or halogen-containing phenyl phosphate.

6. Fibers according to claim 5, wherein the halogen-containing alkyl phosphate is tris(β-chloropropyl) phosphate.

7. Fibers according to claim 5, wherein the halogen-containing phenyl phosphate is tris(dichlorophenyl) phosphate.

8. Fibers according to claim 5, wherein the halogen-containing alkyl phosphate or halogen-containing phenyl phosphate content is 0.5 to 5.0 wt % with respect to the meta-linkage-containing aromatic polyamide.

9. Fibers according to claim 1, wherein the meta-linkage-containing aromatic polyamide composition further contains a halogen-containing alkyl phosphate or halogen-containing phenyl phosphate and an ultraviolet absorber.

10. Fibers according to claim 9, wherein the halogen-containing alkyl phosphate is tris(β-chloropropyl) phosphate.

11. Fibers according to claim 9, wherein the halogen-containing phenyl phosphate is tris(dichlorophenyl) phosphate.

12. Fibers according to claim 9, wherein the halogen-containing alkyl phosphate or halogen-containing phenyl phosphate content is 0.5 to 5.0 wt % with respect to the meta-linkage-containing aromatic polyamide.

13. Fibers according to claim 9, wherein the ultraviolet absorber content is 2.0 to 6.0 wt % with respect to the meta-linkage-containing aromatic polyamide.

14. Fibers according to claim 9, wherein the ultraviolet absorber is a benzotriazole-based ultraviolet absorber.

15. Fibers according to claim 14, wherein the ultraviolet absorber is 2-[2-hydroxy-3,5-bis(α,α'-dimethylbenzyl)phenyl]-2H-benzotriazole.

* * * * *